United States Patent [19]

Porowski

[11] Patent Number: 5,301,983
[45] Date of Patent: Apr. 12, 1994

[54] PIPE COMPONENT SEAL ASSEMBLY

[76] Inventor: Jan S. Porowski, 241 Curry Hollows Rd., Pittsburgh, Pa. 15236

[21] Appl. No.: 856,349

[22] Filed: Mar. 23, 1992

[51] Int. Cl.$^5$ .............................................. F16L 55/16
[52] U.S. Cl. ......................................... 285/10; 285/15; 285/294; 285/297; 285/420; 138/99
[58] Field of Search ................... 285/15, 294, 297, 10, 285/11, 420; 277/72 FM, 73; 138/99

[56] References Cited

U.S. PATENT DOCUMENTS

| | | | |
|---|---|---|---|
| 866,395 | 9/1907 | Skinner et al. | 285/15 |
| 1,590,580 | 6/1926 | Hume | 285/10 |
| 2,356,630 | 8/1944 | Strecker | 285/10 |
| 3,550,638 | 12/1970 | Smith | 285/15 |
| 3,610,663 | 10/1971 | Lago | 285/294 |
| 3,977,704 | 8/1976 | Meyer | 285/294 |
| 4,049,296 | 9/1977 | Harrison | 285/15 |
| 4,240,650 | 12/1980 | Adams | 285/15 |
| 4,323,526 | 4/1982 | Hilbush, III | 285/15 |
| 4,709,729 | 12/1987 | Harrison | 138/99 |
| 4,927,181 | 5/1990 | Clotola | 285/15 |
| 4,993,875 | 2/1991 | Nicholson | 285/294 |
| 5,071,139 | 12/1991 | Warner | 277/73 |

FOREIGN PATENT DOCUMENTS

| | | | |
|---|---|---|---|
| 25968 | 10/1956 | Fed. Rep. of Germany | 285/10 |
| 224087 | 6/1985 | Fed. Rep. of Germany | 285/15 |
| 577029 | 5/1946 | United Kingdom | 285/15 |
| 850127 | 9/1960 | United Kingdom | 285/10 |
| 963910 | 7/1964 | United Kingdom | 285/297 |

*Primary Examiner*—Eric K. Nicholson
*Attorney, Agent, or Firm*—Roylance, Abrams, Berdo & Goodman

[57] ABSTRACT

A pipe component seal assembly comprising a pipe system component capable of carrying a fluid under pressure and having means communicating to the atmosphere through which the fluid in the pipe system component can flow, a housing secured to the outer surface of the pipe system component surrounding the communicating means and in which a sealant under pressure is maintained in contact with the communicating means, and a charger attached to the housing and having an opening therein communicating with the interior of the housing through an opening in the housing and means to force sealant from the charger under pressure into the interior of the housing through the two openings.

7 Claims, 2 Drawing Sheets

5,301,983

PIPE COMPONENT SEAL ASSEMBLY

BACKGROUND OF THE INVENTION

1. Field of the Invention

This invention relates to a pipe component seal assembly comprising a pipe system component capable of carrying a fluid under pressure therein and having means therein communicating with the atmosphere through which said fluid is capable of flowing, a housing securely attached to the outer surface of said pipe system component surrounding said communicating means having a space therein for maintaining a sealant under pressure in contact with said communicating means, and a charger securely attached to said housing and having an opening therein communicating with the interior of said housing through an opening in said housing and means to force sealant from said charger under pressure into the interior of said housing through said openings.

2. Description of the Prior Art

It is known in the art to provide a pipe system component carrying a fluid under pressure therein that can leak to the atmosphere with sealing means under pressure in the vicinity of said leakage to inhibit leakage therefrom. This is shown, for example, in pamphlets available from Injects, P. O. Box 394, North Troy, Vt. 05859. Generally when this happens a sealer is injected under pressure through an opening of said pipe system component into said sealing means, the injector is then removed, the opening is closed and the leakage of fluid is substantially stopped. However, sealant loss often reoccurs, for example, from the housing holding the sealant under pressure, when the pressure is reduced and fluid under pressure in the pipe system component will flow into the housing and then out into the atmosphere. When this happens, an injector will have to be remounted onto the pipe system component and additional sealant will have to be added thereto, and this procedure can be repeated again and again, with much loss of fluid and its attendant consequences.

In accordance with the invention defined and claimed herein, a charger is permanently mounted onto said pipe system component and the original desired pressure on the sealant sufficient to maintain fluid within the pipe system component can be automatically maintained, or this can be easily and quickly remedied manually.

SUMMARY OF THE INVENTION

I have found the above problems can be minimized, or can be effectively overcome, by providing a seal assembly comprising a pipe system component capable of carrying a fluid under pressure therein, but wherein means exist for communicating from the interior of said pipe system component to the atmosphere through which said fluid is capable of flowing, a housing securely attached to the outer surface of pipe system component surrounding said communicating means having a space therein for maintaining a sealant under pressure in contact with said communicating means, a charger securely attached to said housing and having at least on opening in said housing and means for forcing a sealant from said charger under pressure to the interior of said housing through said openings.

BRIEF DESCRIPTION OF THE INVENTION

Figure 1:
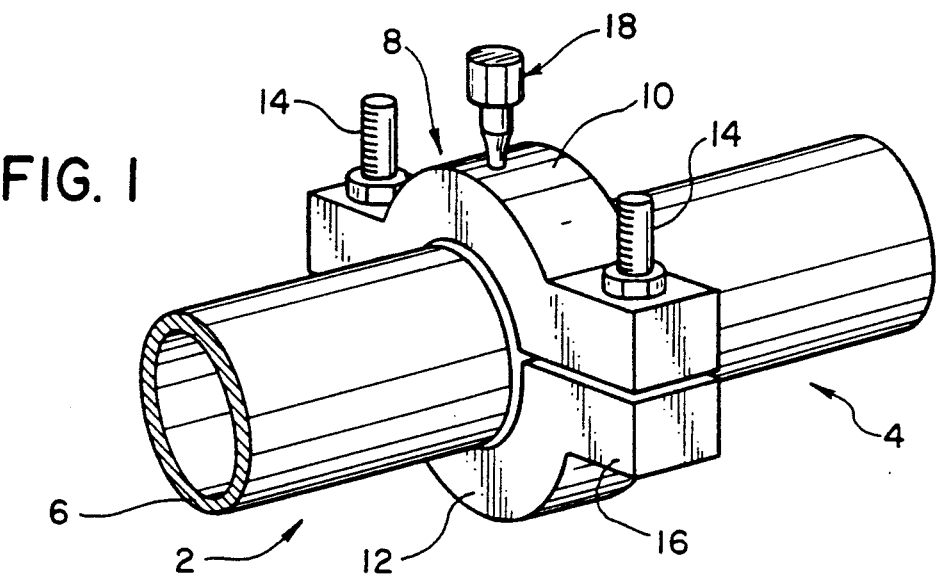
FIG. 1 is an isometric view of the pipe component seal assembly of this invention.

Referring to FIG. 1, reference numeral 2 refers to the pipe component seal assembly disclosed and claimed herein wherein the pipe system component 4 is shown to be a portion of a pipe 6, suitable for carrying a fluid under pressure therein. Surrounding said pipe system component 4 is a housing 8, composed, for example, of two segments 10 and 12, securely mounted thereto in any suitable manner, such as threaded bolts 14 that pass through facing flanges 16 on housing segments 10 and 12. Securely attached to said housing 8 is charger 18.

Figure 2:
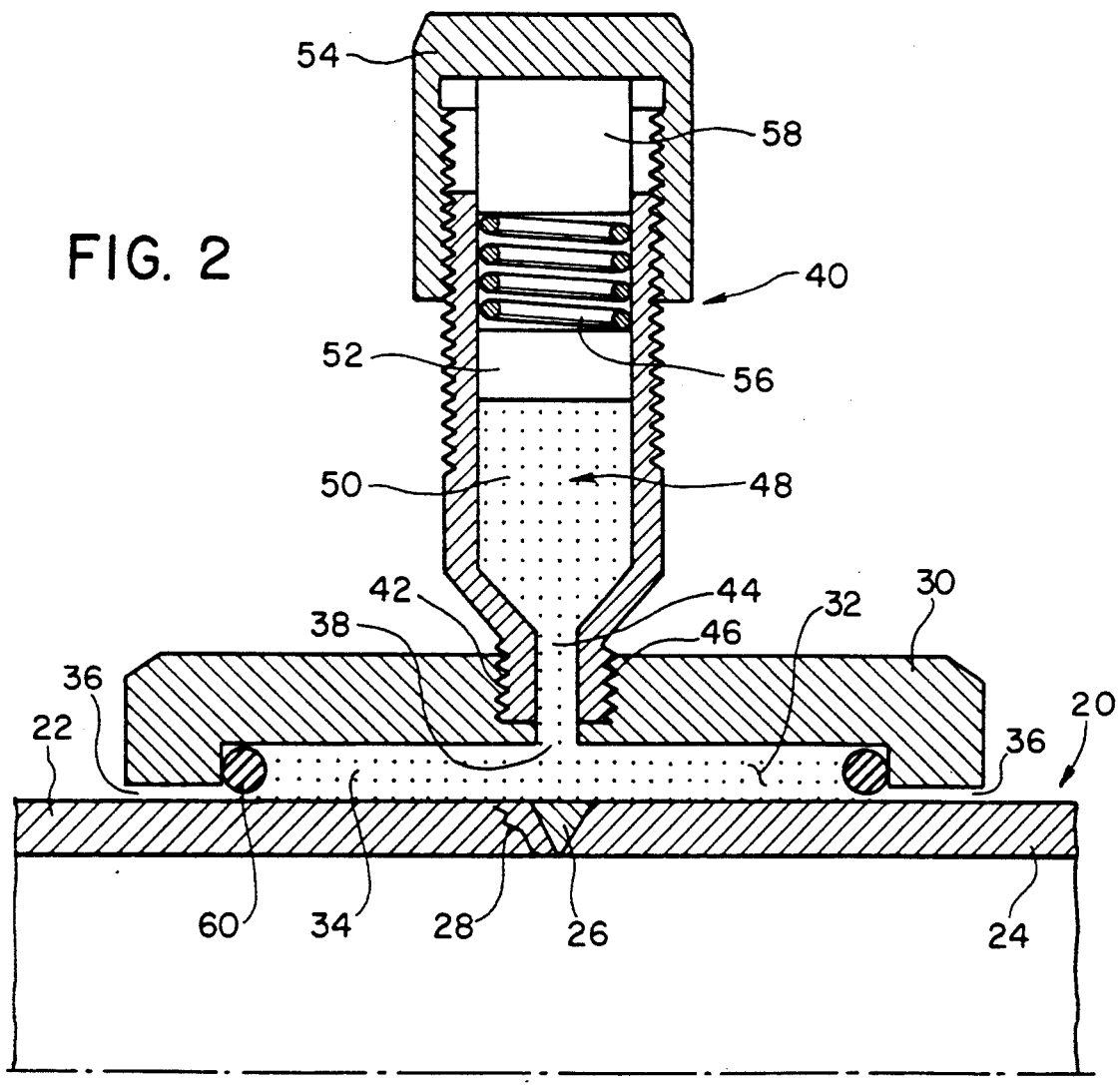
FIG. 2 is a section the pipe component seal assembly wherein a sealant under pressure is automatically forced onto the sealing means to maintain the desired pressure thereon.

A preferred embodiment of the invention is illustrated in FIG. 2 wherein sealant is automatically supplied or received onto the seal to maintain the desired elevated pressure thereon. The pipe component seal assembly illustrated therein has a pipe system component 20 composed of two aligned pipes 22 and 24 joined together by a circumferential weld 26 in which a crack 28 has formed adjacent circumferential weld 26 which permits communication of high-pressure fluid in pipe system component 20 to the outer surface thereof and therefore to the atmosphere.

Surrounding the outer surface of pipe system component 20 and attached securely thereto, as shown, for example in FIG. 1, is a housing 30 having an interior space 32 in which there is disposed under pressure sealing means 34, which can be a resilient solid material, such as silicon rubber, as shown in FIG. 2, or a viscous paste, such as Kevlar fiber high temperature sealant sold by Injects, supra, in contact with the adjacent outer surface of said pipe system component 20, the circumferential weld 26 and the crack 28. The pressure brought to bear on said outer surface of said pipe system component 20 in the arrangement shown will amount to about 20 to about 5000 psig, that is, higher than the pressure within the pipe system component 20, and therefore sufficient to inhibit or prevent flow of fluid through said crack 28.

However, the pressure so imposed on the outer surface of pipe system component 20 can, unfortunately, be reduced, in time, for many reasons. For example, some of the sealing means, such as paste, can seep outwardly from the interior 32 of housing 30 to the atmosphere through a channel 36 that can arise between the upper surface of the pipe system component 20 and the adjacent lower outer surface of housing 30. This can happen, for example if the adjoining surfaces become irregular for any reason or because of differential thermal expansion and contraction in either housing 30 or pipe system component 20. The resulting loss of sealing means in housing 30 will also result in reduction of pressure therein, thus permitting the flow of fluid into interior space 32 and then through channel 36 to the atmosphere.

In the past when this occurred an opening was made in housing 30, sealant was then injected therein until the desired pressure was restored and the opening closed. When leakage of fluid subsequently occurred injection was repeated as required.

According to the invention herein, housing 30 is provided with an opening 38 therein into which an charger 40 is fixedly attached thereto through a portion 42 thereof having an opening 44 therein communicating with opening 38. The charger 40 is fixedly attached to the housing 30 in any convenient or conventional manner, for example, by welding. In a preferred embodiment, however, as shown in FIG. 2, such attachment is made by providing the outer surface of portion 44 of the charger 40 and the adjacent surface of housing 30 with matching threads 46.

Figure 4:
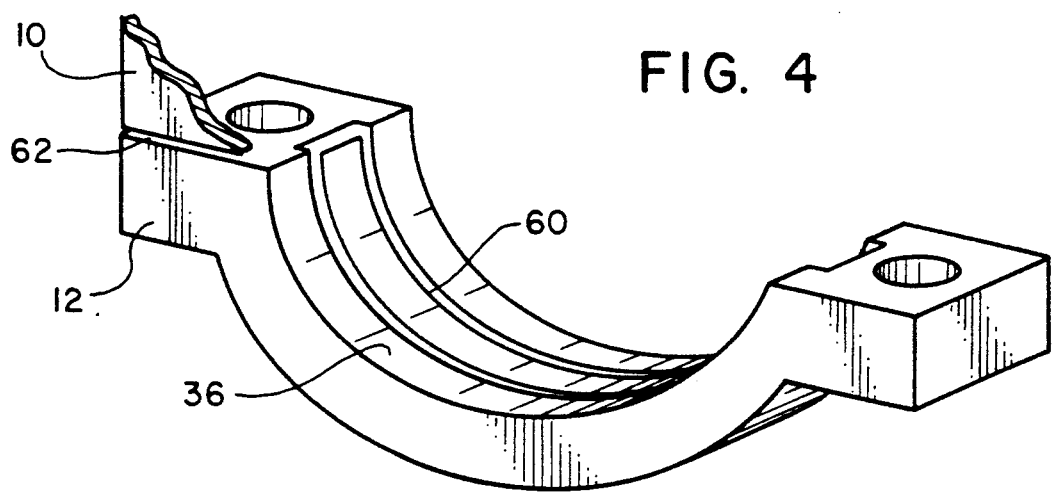
FIG. 4 is an isometric view of housing segments provided with a seal therein.

The charger 40 has an inner portion 48 communicating with opening 44 in which there is disposed sealant 50 capable of being introduced into the interior space 32 in housing 30. Disposed on said sealant 50 is a piston 52 that is used to force said sealant into housing 30. The charger 40 is closed at the upper end thereof in any convenient manner, for example, using a nut 54, preferably threadedly attached, as shown, or welded to the outer surface of said charger. Disposed between piston 52 and the nut 54, and securely attached to each is a spring 56. Since in the preferred embodiment nut 54 is threaded to the body of charger 40, rotation thereof initially, and, later if required, will help adjust the pressure brought to bear by the spring 56 on piston 52. In order to facilitate assembly of the charger 40, a washer 58, having a diameter slightly smaller than the diameter of the inner space in the charger is attached to the underside of nut 54 in any suitable manner. In a preferred embodiment, as shown in FIGS. 2 and 4, segments 10 and 12 are provided with a seal 60 to inhibit seepage of sealant 34 through circumferential channels 36 and gaps 62 (FIG. 4) between segments 10 and 12.

Thus, in the embodiment of FIG. 2, the pressure on the sealing means 34 on the outer surface of the pipe system component 20 is automatically maintained at the pressure level sufficient to prevent seepage of fluid through crack 28 at all times, since any loss of sealing means through channel 36 is automatically compensated for by the action of spring 56 exerting its force on piston 52.

It is apparent that there exists uninterrupted communication between the interior space 32 of housing 30 and the inner portion of charger 40 containing sealant 50 and therefore movement of sealant 50 can occur in both directions, that is, in and out of charger 40. Therefore, in the event differential thermal expansion occurs in housing 30 and in pipe system component 20, which might result in a reduction of volume in housing 30, increased pressure thus occurring in housing 30 is automatically relieved by movement of sealant 50 into charger 40 rather than through channel 36.

Figure 3:
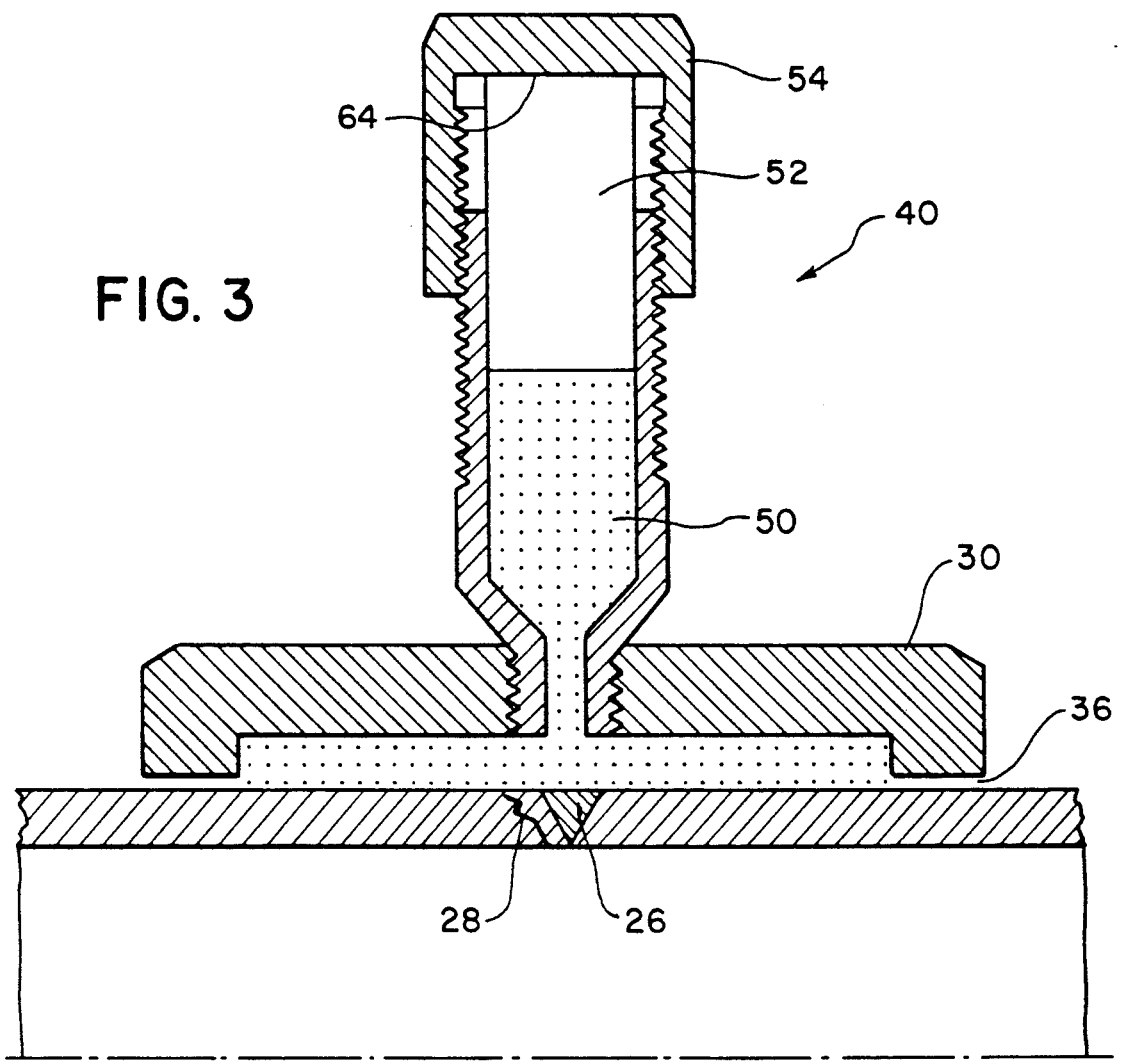
FIG. 3 is a section of an additional embodiment of the invention herein wherein manual means is used to force a sealant under pressure onto the sealing means.

The embodiment of FIG. 3 is similar to that of FIG. 2, except that the movement of sealant 50 into housing 30 needed to replace the amount lost therefrom by seepage through channel 36 is done manually. In this embodiment the nut is always threaded to the body of the charger 40, the spring 56 is not used, but the piston 52 always extends outwardly and upwardly from the body of the charger into contact with the inner surface portion 64 of the nut 54, as shown in FIG. 3. In this embodiment, when additional sealant 50 is desired in housing 30, nut 54 is simply rotated, the piston 52 moves downwardly, forcing sealant 50 into the housing 30, sufficient to maintain the desired pressure on the outer surface of pipe system component 4. When leakage of sealant 50 again occurs from housing 30, introduction of fresh sealant 50 into housing is again quickly and efficiently carried out.

In the preferred embodiment using the pipe component seal assembly of FIG. 2 as an example therefor, pressurized hot water, at a temperature of 307° F. and a pressure of about 1300 psig, flows through a pipeline having a diameter of 8.625 inches composed of segments 22 and 24, welded to each other by means of a circumferential weld 26, having a wall thickness of 0.5 inch in which a crack 28 has formed therein adjacent to said weld that extends from the interior to the exterior surface thereof. A metal housing 30 is securely attached, as in FIG. 1, to the pipeline, surrounding the weld 26 and the crack 28. The interior of the housing 30 has a volume of 2.7 cubic inches and is filled with a sealant composed of silica rubber, which is maintained therein under a pressure of 2000 psig. Housing 30 has an inner diameter of 9.08 inches into which a charger 40 is fixedly and threadedly attached thereto. The interior of the charger has an inner diameter of about one inch, tapering down to the portion attached to the housing 30. A sealant paste (Kevlar fiber, supra) is disposed in the lower portion of charger 40, upon which a piston 52 placed having a diameter coextensive with inner diameter of the major portion of charger 40. The charger 40 is sealed at the top thereof using a nut 54 threaded to the upper portion of the charger. Disposed between the piston 52 and the nut 54 is a disc spring, having a stiffness sufficient to force continuous sealant communication with the sealant in housing 30 so that the pressure therein is continuously maintained at the desired level sufficient to inhibit flow of fluid through crack 28.

Although the pipe system component herein has been shown as being a pipeline, it is obvious that the invention herein can be applied to other pipe system components, such as elbows, tees, flanges, valves, stuffing boxes, nozzles, etc.

Obviously, many modifications and variations of the invention, as hereinabove set forth, can be made without departing from the spirit and scope thereof, and therefore, only such limitations should be imposed as are indicated in the appended claims.

I claim:

1. A pipe seal assembly for sealing a crack in a pipe, comprising:
    a housing adapted to be attached to the pipe around the crack and containing therein a sealant maintained under pressure and in contact with the crack in the pipe; and
    a charger securely attached to said housing and having an opening therein for fluidly communicating with the interior of said housing through an opening in said housing, first means for automatically pressurizing and forcing said sealant from said charger under pressure into said housing through said openings and second means for manually adjusting the pressure on the sealant and forcing said sealant from said charger under pressure into said housing through said openings.

2. The pipe seal assembly of claim 1 wherein said first means is a spring-actuated member.

3. The pipe component seal assembly of claim 2 wherein said spring-actuated means includes a piston and a spring mounted on said piston to actuate the same.

4. The pipe seal assembly of claim 3 wherein said charger has an interior portion adjacent said opening therein containing said sealant therein, said piston lying on said sealant, said second means being remote from said opening in said charger and closing the same, and said spring disposed between said piston and said second means.

5. The pipe seal assembly of claim 4 wherein said second means includes a nut threaded to the body of said charger.

6. The pipe seal assembly of claim 1 wherein said first means includes a piston and a spring mounted on said piston to automatically actuate said piston into contact with said sealant, said second means includes a closure nut for manually forcing said piston into contact with said sealant.

7. The pipe seal assembly of claim 6 wherein said charger includes an interior portion adjacent said opening therein containing said sealant therein, said piston lying on said sealant and extending outwardly from said charger, said nut being threaded to said charger remote from said opening, and said spring mounted between said piston and said nut.

* * * * *